Dec. 20, 1966 H. J. YOST ETAL 3,293,554

STABLE WIDE BAND PULSE DELAY

Filed March 31, 1964 2 Sheets-Sheet 1

Herman J. Yost
James B. Couvillon
Bernard L. Harris,
INVENTORS.

BY Harry M. Saragovitz
Edward J. Kelly
Herbert Berl
Robert C. Sims
ATTORNEYS

STABLE WIDE BAND PULSE DELAY

Filed March 31, 1964 2 Sheets-Sheet 2

Herman J. Yost
James B. Couvillon
Bernard L. Harris,
INVENTORS.
BY Harry M. Saragovitz
Edward J. Kelly
Herbert Berl
Robert C. Sims
ATTORNEYS

United States Patent Office 3,293,554

Patented Dec. 20, 1966

3,293,554

STABLE WIDE BAND PULSE DELAY

Herman J. Yost, Ellicott City, James B. Couvillon, Laurel, and Bernard L. Harris, Baltimore, Md., assignors to the United States of America as represented by the Secretary of the Army

Filed Mar. 31, 1964, Ser. No. 356,333
18 Claims. (Cl. 328—154)

This invention relates to a device which allows a wide band pulse to be variably delayed in time without deterioration in its pulse amplitude and shape, or in time jitter of the original pulse.

In radar systems a digital tracker predicts a Doppler correction which is related to a time delay in linear FM systems. This delay is converted into a word and is read into storage registers. The tracker produces identical pulses to time correlate properly with a received signal. These pulses must be delayed without distortion over a wide range of different delays. The phase relationship of the pulse with a basic frequency or the time jitter must be maintained without any deterioration.

It is therefore an object of this invention to provide a system which will delay a pulse signal without any distortion of its amplitude and shape.

A further object of this invention is to provide a delay system which will delay a pulse signal without any deterioration in the time jitter of the original pulse.

A still further object of my invention is to provide a delay system which will delay two signals by an equal amount.

According to the present invention a delay system having a predetermined delay pulse output upon correlation of two signals is provided. Two delay chains are provided: one for an information signal and one for the basic operating frequency signal of this section of the radar unit. A digital tracker determines how much delay is required of the information signal. This required delay is in the form of a digital word which is stored in a plurality of registers. The registers are connected to the delay chains such that both delay chains will delay their inputs by the amount required and, also, by equal amounts so that the original relationship of the information signal to the basic frequency signal is undisturbed. The outputs of the delay chains are fed to an AND gate so that there will be an output of the delay system only when both signals are present.

These and other objects and advantages of the present invention will become apparent from the following detailed description and from the accompanying drawings, in which.

Figure 1:
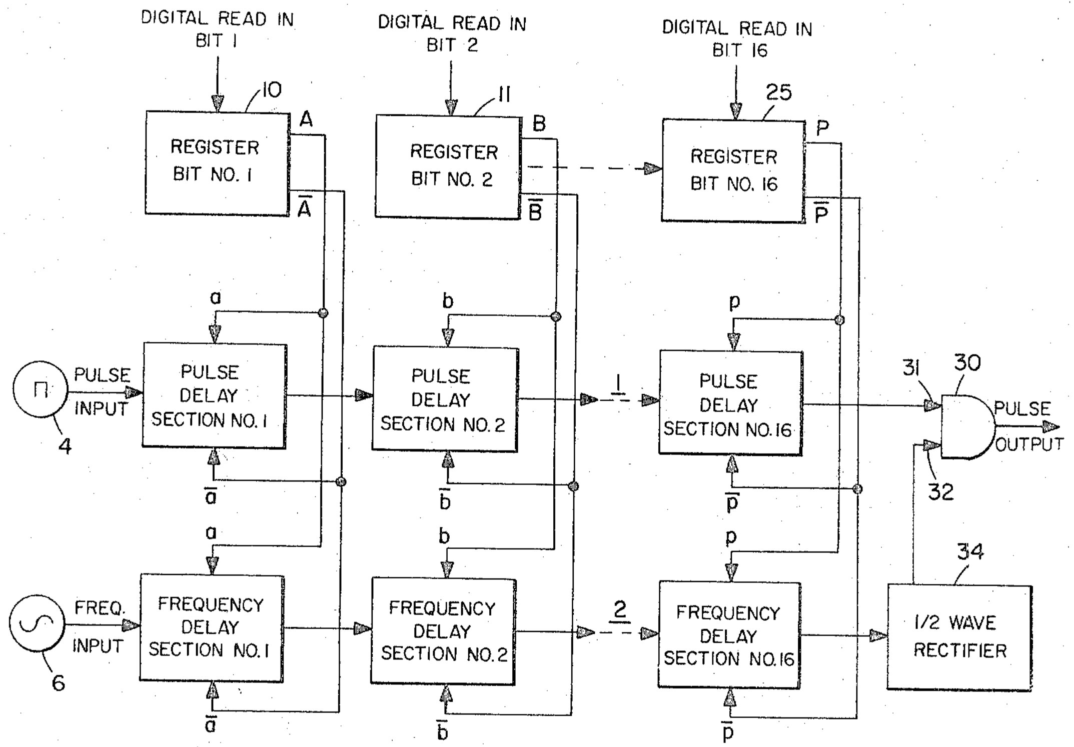
FIGURE 1 is a block diagram illustrating one preferred form of the present invention.
Figure 3:
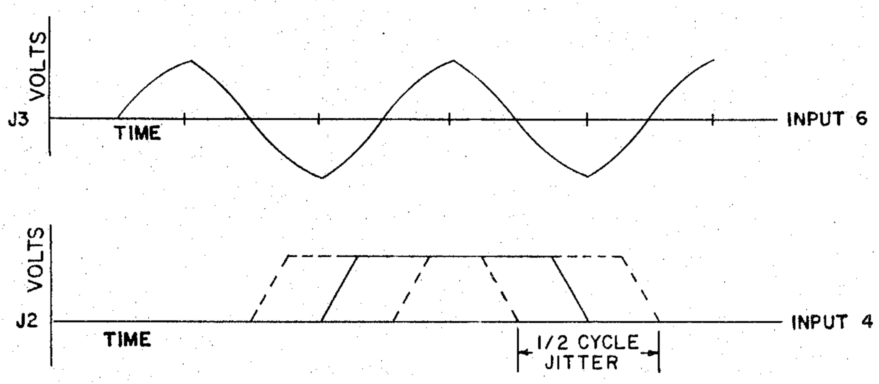
FIGURE 3 illustrates wave forms of the present invention, wherein the abscissa is time and the ordinate is voltage.

In the block diagram of FIGURE 1 there is shown two parallel chains 1 and 2 of delay sections, each 16 sections in length. Theoretically any number of sections could be used. Chain 1 is entered with a pulse from a signal source 4. FIGURE 3 shows this pulse as the solid portion of curve J2. Chain 2 is entered wtih a basic frequency from a source 6, from which the pulse is derived. FIGURE 3 shows the wave form of source 6 in curve J3. In this embodiment the pulse is a 50-nanosecond pulse. The basic frequency is 10 mc. The jitter or phase difference in the pulse with respect to the frequency may be in time as much as ½ cycle of the basic frequency. FIGURE 3 indicates the possible jitter in the pulse by broken lines in the curve J2. Pulse delay chain 1 is a wide band device; whereas frequency delay chain 2 is a narrow band device.

A plurality of registers 10–25 are provided to control delay chains 1 and 2. The registers have outputs A–P and $\overline{A}$–$\overline{P}$ connected respectively to inputs *a–p* and $\overline{a}$–$\overline{p}$ of the delay chains 1 and 2. The outputs of the registers are such that when the barred output is a "one" then the unbarred output is a "zero," and when the barred output is a "zero" then the unbarred output is a "one." For example, when $A=1$, $\overline{A}=0$ and when $A=0$, $\overline{A}=1$.

An output of pulse delay section 16 is fed to an input 31 of an AND gate 30. An output of frequency delay section 16 is fed to input 32 of the AND gate 30 by way of a half wave rectifier 34.

Figure 2:
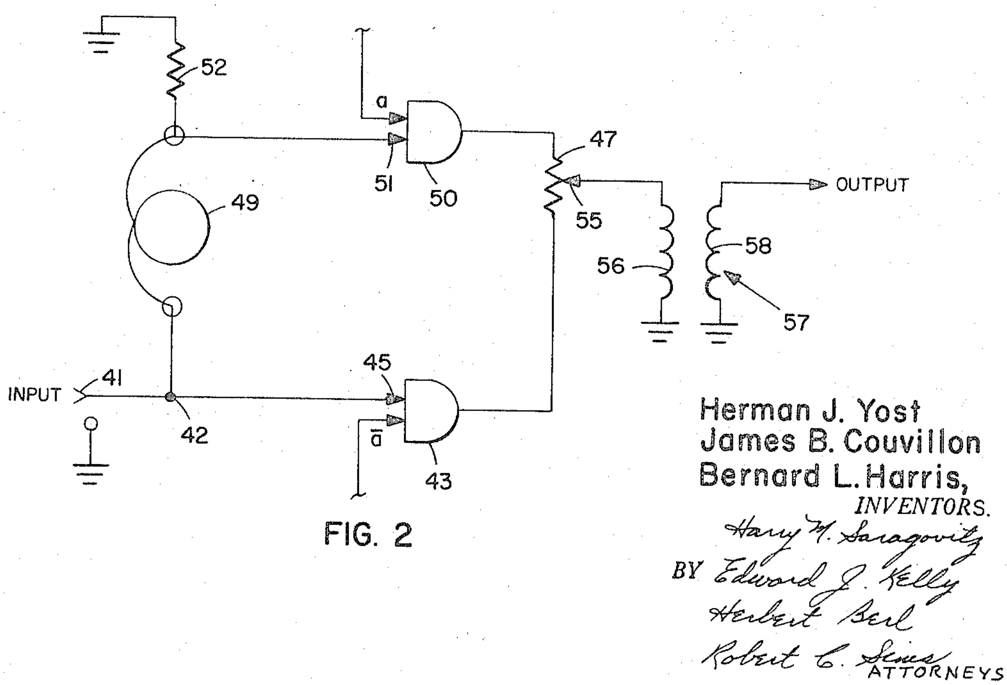
FIGURE 2 is a schematic circuit diagram of a single delay section of the invention.

A typical delay section of both the pulse delay chain and the frequency delay chain is depicted schematically in FIGURE 2. An input 41 (which may come from the output of 4, 6 or the previous section) is connected to terminal 42. A first AND gate 43 has an input 45 connected to said terminal 42 and an output connected to one side of a balancing resistor 47. A loop of coaxial cable 49 forms the pulse delay and has one side connected to terminal 42 and another side connected to input 51 of AND gate 50. Said other side of the cable also being connected to a grounded terminating resistor 52. The output of AND gate 50 is connected to another side of balancing resistor 47.

The outputs of the register, not shown in FIGURE 2, are connected to input *a* of AND gate 50 and to input $\overline{a}$ of AND gate 43. Therefore, only one gate will conduct upon receipt of an input signal at terminal 42. This will determine whether the input signal will take the delayed path through delay cable 49, gate 50, and upper portion of resistor 47, or take the undelayed path through gate 43 and lower portion of resistor 47. Balancing resistor 47 has a sliding arm 55 connected to a primary winding 56 of transformer 57. Slider arm 55 is positioned so that the delay section will have the same impedance regardless of which AND gate is conducting. Secondary winding 58 of transformer 57 is connected to the input of the next delay section or to one input of AND gate 30.

The other sections are set up the same way except for the length of the cable. The lengths of the cables in sections 2–16 are binary multiples of the length of the cable in section 1. The length of cable in pulse delay section 1 is equal to the length of the cable in frequency delay section 1.

In radar systems a digital tracker, not shown, predicts a Doppler correction which is related to a time delay in a FM system. This delay is converted into a digital word (bits 1–16) and read into registers 10–25. The registers are connected to the AND gates of the delay sections; therefore determining whether AND gate 43 or AND gate 50 will conduct. This in turn determines whether delay element 49 is in the conducting path of the section or not. There are 16 delay elements in each delay chain, and these delay elements all have different delay times. The delay times of each of the sections in delay line 1 or 2 are all different binary multiples of the length of the delay time in section 1. The registers can be set to select any of the different combinations of the delay times to be inserted in the signal path through the delay chain. By this method $2^{16}$ (65, 536) different delays can be selected. The output of chain 1 is the pulse inserted, with very little distortion in its leading edge. In the delay chain 1 any distortion of the inserted pulse will appear after the leading edge. Since the present invention is mainly concerned with time of the start of the signal pulse, the shape of the pulse after the leading edge makes little difference. The output of chain 2, because it is narrow-band, comes out of the last delay section 16 undistorted. The gates are balanced so that no matter what path the signal takes the output amplitude is constant. Further, no matter what path the signal takes the impedance is constant.

The operation of the invention may be best understood by a hypothetical example of a single return from a single target. From previous returns and other information, the digital tracker has predicted a need for Doppler correction due to relative movement of the target. In linear FM radar system this Doppler correction is related to a time delay. The digital tracker predicts this time delay, converts it into a digital word, and reads it into storage registers 10–25. For example, say the digital read-in word to the registers is 0110010110100110. This would mean that register 10 would have a "zero" output at A and a "one" output at $\overline{A}$, register 11 would have a "one" output at B and a "zero" output at $\overline{B}$—and register 25 will have a "zero" output at P and a "one" output at $\overline{P}$. Due to the connections to the gates of the delay sections by the registers, this means that the signal path through each delay section 1 will be through the lower gate 43; therefore the signals will bypass delay cable 49 and will not be delayed by section 1. However, each section 2 will have the enabled signal path through its upper gate; therefore the signals will pass through the delay cable and will be delayed thereby. The signals will be delayed also in sections 12, 15, 17, 18, 20, 23, and 24. There will be no delay of the signals in sections 11, 13, 14, 16, 19, 21, 22, and 25. The basic frequency input signal 6 will be present at all times on delay chain 2, and it will be delayed thereby by the amount of delay set by the digital word. The output of delay chain 2 is fed to input 32 of the AND gate 30 by way of ½ wave rectifier 34. However, there will be no output from gate 32 until there is also an input at 31. A pulse 4 which represents the time of the return of the target arrives at delay line 1. It is delayed by delay chain 1 the same amount that signal 6 is delayed. The output of delay chain 1 is fed to input 31 of gate 32, and AND gate 32 will have an output which is delayed in time from the arrival of pulse 4 by the amount set by the digital tracker.

While the invention has been described with reference to a preferred embodiment thereof, it will be apparent that various modifications and other embodiments thereof will occur to those skilled in the art within the scope of the invention. Accordingly, we desire the scope of our invention to be limited only by the appended claims.

We claim:

1. In a delay system having a wide band pulse signal which has a definite phase relation with a basic frequency signal, the combination of first and second chains of delay sections; a plurality of registers having outputs connected to inputs of only one delay section in both the first and second chains of delay sections; said first and second chains each having an input and an output terminal; means connecting the pulse signal to the input terminal of said first chain; means connecting the basic frequency signal to the input terminal of said second chain; a first gate means having input terminals and an output terminal; means connecting the output terminal of said first chain to one input of said gate means; and half wave rectifier means connecting the output terminal of said second chain to another input terminal of said gate means.

2. A delay system as set forth in claim 1, wherein said gate means acts as an AND gate.

3. Delay system as set forth in claim 2, wherein said delay sections each have a delay element therein which can be selectively switched into and out of a conductive circuit of said section.

4. A delay system as set forth in claim 3, wherein said delay elements are caused to be switched into and out of the circuit by the outputs of said registers.

5. A delay system as set forth in claim 4, wherein said delay sections each have a second and a third AND gate; said second AND gate having a first input connected to one output of one of said register sections and having another input connected in a series circuit with said delay element and the input of the delay section; said third AND gate having an input connected to another output of said one register and having another input connected to the input of the delay section; and a balancing impedance having its ends connected to the outputs of said second and third AND gates and having a middle connection forming the output of the delay section.

6. In a delay system having a wide band pulse signal which has a definite phase relation with a basic frequency signal, the combination of a first chain of delay sections each having three inputs and an output; a plurality of registers each having two output terminals; the output terminals of said registers being connected to two of the inputs of successive delay sections; means connecting the wide band pulse signal to the remaining input of a first section of said chain of delay sections; the output of each delay section, except the last, being connected to the remaining input of the succeeding delay section; a second chain of delay section each having three inputs and an output; the output terminals of said register sections being connected to two of the inputs of successive delay sections of said second chain; means connecting the basic frequency signal to the remaining input of a first section of said second chain of delay sections; the output of each delay section of said second chain, except the last, being connected to the remaining input of the succeeding delay section; first AND gate having first and second input terminals and an output terminal; means connecting the last section of the first chain to the first input terminal of said AND gate; and means connecting the last section of the second chain to the second input terminal of said AND gate.

7. A delay system as set forth in claim 6, wherein said delay sections each have a delay element therein which can be selectively switched into and out of the section.

8. A delay system as set forth in claim 7 wherein said delay element is caused to be switched into and out of a circuit of the delay section by the outputs of the registers.

9. A delay system as set forth in claim 8, wherein said delay sections each have second and third AND gates, said second AND gate having a first input connected to one output terminal of one of said register sections and having another input connected in a series circuit with said delay element and the input of the delay section, said third AND gate having an input connected to the other output terminal of said one register and having another input connected to the input of the delay section, and a balancing impedance having its ends connected to the outputs of said second and third AND gates and having a middle connection forming the output of the delay section.

10. A delay system as set forth in claim 9, wherein said delay element is a loop of coaxial cable.

11. A delay system as set forth in claim 10, wherein the lengths of the cables in a particular section are cut such that they are binary multiples of the length of the cable in the first delay section of the chain.

12. A delay section comprising in combination an input terminal; an output terminal; a delay element having first and second terminals; first gate means having first and second inputs and a first output; a second gate means having third and fourth inputs and a second output; a balancing element having third, fourth and fifth terminals; a register having sixth and seventh output terminals; means connecting the input terminal to said first terminal, said second terminal to said first input, said first output to said third terminal and said fourth terminal to said output terminal; means connecting the input terminal to said third input, and said second output to said fifth terminal; and means connecting the sixth terminal to said second terminal and said seventh terminal to the fourth terminal.

13. A delay section as set forth in claim 12, wherein said delay element is a loop of coaxial cable.

14. A delay section as set forth in claim 12, wherein said first and second gate means are AND gates.

15. A delay section as set forth in claim 14, wherein said balancing element is a resistor having a sliding arm connected to the fourth terminal.

16. A delay section as set forth in claim 15, wherein the position of the sliding arm is adjusted so that the delay section will have identical impedance regardless of whether the first or the second AND gate is conducting.

17. A delay section as set forth in claim 16, wherein said delay element is an inductor.

18. A delay section as set forth in claim 16, wherein said delay element is a loop of coaxial cable.

References Cited by the Examiner

UNITED STATES PATENTS

| | | | |
|---|---|---|---|
| 2,906,869 | 9/1959 | Kramskoy | 328—154 X |
| 3,158,692 | 11/1964 | Gerkensmeier | 328—154 |

ARTHUR GAUSS, *Primary Examiner*.

J. HEYMAN, *Assistant Examiner*.